United States Patent [19]

Memmola

[11] Patent Number: 5,103,221

[45] Date of Patent: Apr. 7, 1992

[54] REMOTE-CONTROL SECURITY SYSTEM AND METHOD OF OPERATING THE SAME

[75] Inventor: Serafino Memmola, Varese, Italy

[73] Assignee: Delta Elettronica S.p.A., Varese, Italy

[21] Appl. No.: 446,240

[22] Filed: Dec. 5, 1989

[30] Foreign Application Priority Data

Dec. 6, 1988 [IT] Italy .................. 83686 A/88

[51] Int. Cl.⁵ .............................................. H04Q 3/02
[52] U.S. Cl. ......................... 340/825.31; 340/825.34; 340/825.69
[58] Field of Search ...................... 340/825.31, 825.69, 340/825.72, 825.34, 426; 70/278; 361/172; 235/382, 382.5; 379/95

[56] References Cited

U.S. PATENT DOCUMENTS

| | | | |
|---|---|---|---|
| 4,535,333 | 8/1985 | Twardowski | 340/825.31 |
| 4,596,985 | 6/1986 | Bongard et al. | 340/825.69 |
| 4,652,860 | 3/1987 | Weishaudt et al. | 340/825.31 |
| 4,686,529 | 8/1987 | Kleefeldt | 340/825.69 |
| 4,761,808 | 8/1988 | Howard | 379/95 |
| 4,779,090 | 10/1988 | Micznik et al. | 340/825.31 |
| 4,800,590 | 1/1989 | Vaughan | 340/825.34 |
| 4,928,098 | 5/1990 | Dannhaeuser | 340/825.69 |

Primary Examiner—Donald J. Yusko
Assistant Examiner—Edwin C. Holloway, III
Attorney, Agent, or Firm—Peter K. Kontler

[57] ABSTRACT

A security system has a remote-control unit, a receiving unit and an operating unit connected to the receiving unit and designed to perform a security function. The remote-control unit comprises a keyboard, an encoder and a transmitter. The encoder is programmed with an algorithm and a base code and, in response to consecutive actuations of the keyboard, operates consecutively with the algorithm, beginning from the base code, to generate a series of modified codes. The encoder also produces a corresponding series of encoded signals containing the base code and a respective modified code. The encoded signals are sent to the receiving unit by the transmitter. The receiving unit includes a receiver for the signals and a decoder which is activated in response to an incoming signal. The decoder is programmed with the same algorithm and base code as the encoder and, similarly to the encoder, generates a series of modified codes in response to consecutive incoming signals. After the decoder generates a modified code upon being activated by an incoming signal, the decoder compares its base code and modified code, respectively, with the base code and modified code of the signal. The decoder sends a control signal to the operating unit if and only if the two base codes are identical and the two modified codes are identical.

19 Claims, 1 Drawing Sheet

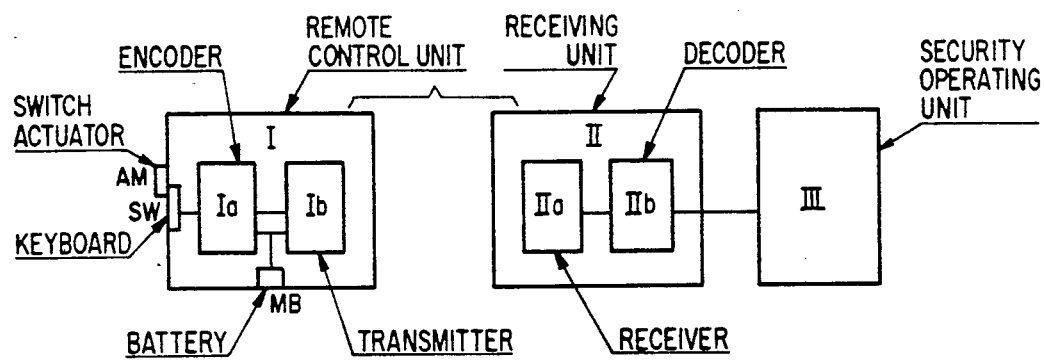
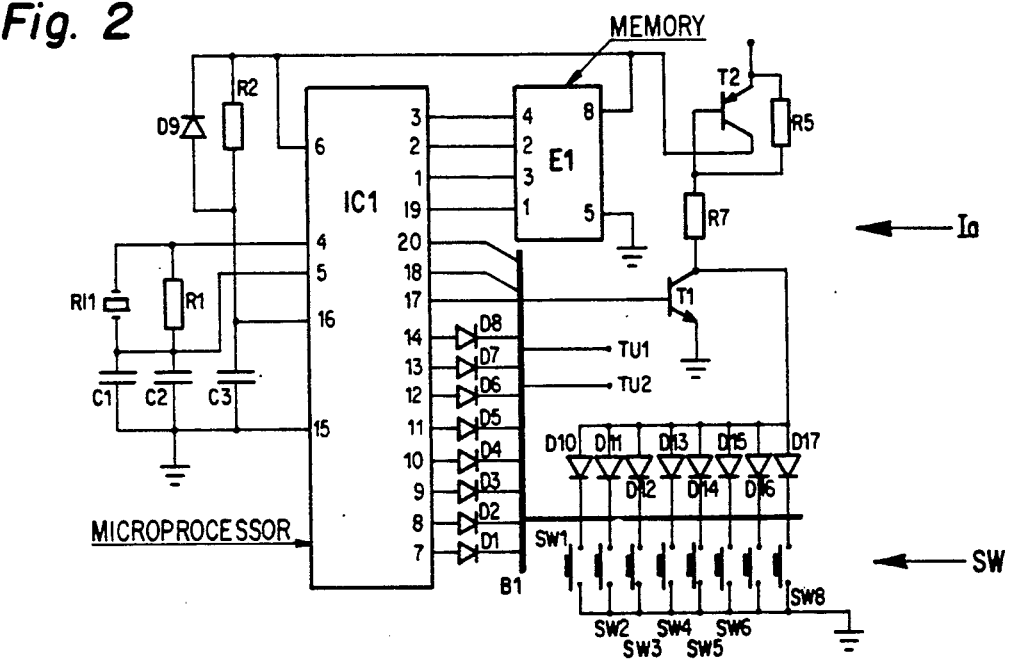
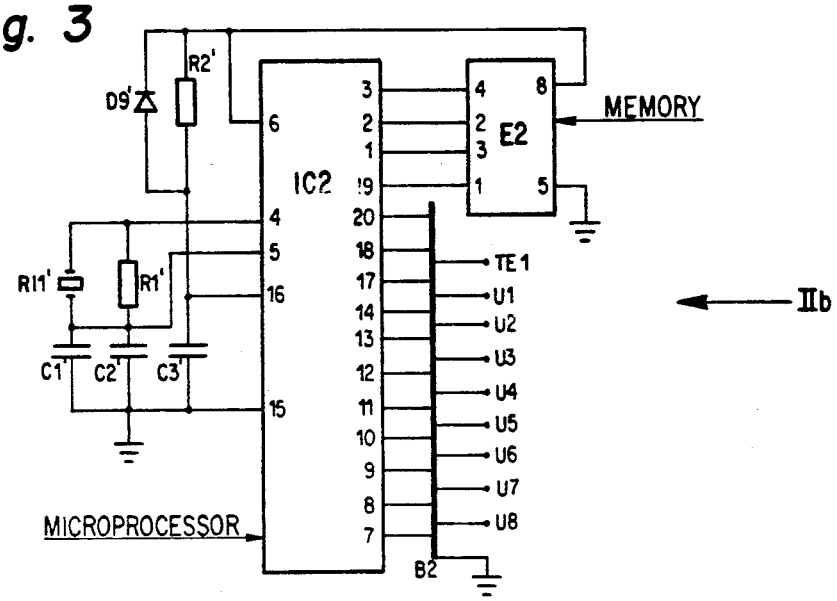

REMOTE-CONTROL SECURITY SYSTEM AND METHOD OF OPERATING THE SAME

CROSS-REFERENCE TO RELATED APPLICATION

This application contains subject matter similar to that in the commonly-owned, allowed U.S. Pat. application Ser. No. 124,885 of Serafino Memmola filed Nov. 24, 1987 for "Antitheft System", and now U.S. Pat. No. 4,884,055.

BACKGROUND OF THE INVENTION

The invention relates generally to a security system.

More particularly, the invention relates to a remote-control security system, e.g., for motor vehicles and buildings.

Remote-control security systems come in many forms. The more sophisticated systems are designed to transmit messages in coded form so that an unauthorized person having a remote-control device operating at the same frequency as such a system is unable to activate the latter since he or she does not know the code employed in the system. By way of example, reference may be had to the commonly-owned U.S. Pat. No. 4,733,215 which discloses an antitheft system of the type using encoded messages.

Although a system which transmits messages in coded form provides a degree of protection against unauthorized activation of the system, such a system is not foolproof. Thus, if an unauthorized person has a remote-control device which is capable of intercepting an encoded message during transmission, storing the message and subsequently retransmitting the message, it would be possible for this person to activate the system which generates the coded message.

SUMMARY OF THE INVENTION

It is an object of the invention to provide a security system having increased protection against unauthorized activation.

Another object of the invention is to provide a remote-control security system which cannot be activated even if a message transmitted by the system is intercepted, stored and retransmitted.

An additional object of the invention is to provide a method which makes it possible to operate a security system in such a manner that the degree of protection against unauthorized activation of the system is increased.

A further object of the invention is to provide a method which allows a remote-control security system to be operated such that the latter cannot be activated even if a message transmitted by the system is intercepted, stored and retransmitted.

The preceding objects, as well as others which will become apparent as the description proceeds, are achieved by the invention.

One aspect of the invention resides in a security system. The security system comprises a first unit for transmitting encoded signals. The first unit, which can be a remote-control unit and portable, has switch means and is programmed to perform an algorithm upon a starting security code in response to a first actuation of the switch means so as to generate a first modified security code different from the starting code. The starting code can, for example, be a base code which is programmed into the first unit during manufacture. The first unit is operative to emit a first encoded signal, which includes the first modified code, in response to the first actuation of the switch means. The security system further comprises a second unit programmed to perform the algorithm upon an initial security code in response to the first encoded signal so as to generate a second modified security code different from the initial code. The initial code could again be a base code which is programmed into the second unit during manufacture and may be identical to the starting code if the latter constitutes a base code which is programmed into the first unit during manufacture. The second unit is operative to compare the second modified code with the first modified code and to emit a control signal for the performance of a security-related function when and only when the second modified code is identical to the first modified code. It is preferred for the security codes to be binary codes and for the algorithm to be binary coded.

The first unit may include a first memory containing the algorithm and the second unit may include a second memory containing the algorithm. If the starting code and initial code are base codes which are programmed into the respective units during manufacture, the starting code and initial code may be stored in the first and second memories, respectively. The first unit may be programmed to store the first modified code in the first memory while the second unit may be programmed to store the second modified code in the second memory.

The first unit may be programmed to perform the algorithm in response to each actuation of the switch means so that, in response to the nth actuation of the switch means, the first unit generates an n-times modified security code obtained by operating with the algorithm n times beginning from the starting code, i.e., upon the first actuation of the switch means, the first unit generates a once-modified code obtained by operating on the starting code with the algorithm; upon the second actuation of the switch means, the first unit generates a twice-modified code obtained by operating on the once-modified code with the algorithm; and so on. The first unit is operative to emit an encoded signal, which includes a respective n-times modified code, in response to each actuation of the switch means. The second unit may be programmed to perform the algorithm in response to each encoded signal arriving at the second unit so that, in response to arrival of an encoded signal at the second unit, the second unit generates an m-times modified security code obtained by operating with the algorithm m times beginning from the initial code. The second unit is operative to compare each n-times modified code with the corresponding m-times modified code and to emit a control signal for the performance of a security-related function when and only when an n-times modified code is identical to the corresponding m-times modified code. The n-times modified codes may be referred to as dynamic codes.

The first unit may include an encoding module, a transmitting module and a power source. The encoding module may comprise the first memory, which is preferably an EPROM, as well as a first microprocessor programmed to store modified codes in, and retrieve modified codes from, the first memory and to perform the algorithm upon the retrieved codes. The first microprocessor may have an internal memory, preferably a RAM, which allows the first microprocessor to read and store the algorithm contained in the first memory, and also allows the first microprocessor to read and store the last modified code entered in the first memory. The first microprocessor can then perform the algorithm on the latest modified code to generate a new modified code which the first microprocessor sends to the transmitting module.

The second unit may include a receiving module for encoded signals and a decoding module designed to emit control signals. The decoding module may comprise the second memory, which is again preferably an EPROM, as well as a microprocessor programmed to store modified codes in, and retrieve modified codes from, the second memory and to perform the algorithm upon the retrieved codes. The second microprocessor may have an internal memory, preferably a RAM, which makes it possible for the second microprocessor to store an incoming encoded signal, to read and store the algorithm contained in the second memory, and to read and store the last modified code entered in the second memory. The second microprocessor is then able to perform the algorithm on this last modified code, to store the resulting, additionally modified code and to compare the latter with the modified code of the incoming signal. The second microprocessor emits a control signal if the additionally modified code is identical to the modified code of the incoming signal and emits no control signal if the two codes differ.

According to one embodiment of the invention, the first microprocessor erases the starting code in the first memory once the algorithm has been performed on the starting code and replaces the latter with the resulting modified code. This modified code is subsequently replaced by the newly modified code derived therefrom via the algorithm, and so on. The second microprocessor here preferably erases the initial code in the second memory after the algorithm has been performed on the initial code and replaces the initial code with the resulting modified code. Such resulting modified code is eventually replaced by the additionally modified code obtained from it by means of the algorithm, and so on.

In accordance with another embodiment of the invention, the starting code and initial code are not erased from the respective memories. Here, the first microprocessor and the transmitting module are designed in such a manner that each encoded signal sent out by the transmitting unit includes not only a modified code but also the starting code. Thus, when the switch means is actuated for the first time, the first microprocessor reads out the starting code from the first memory, performs the algorithm on the starting code to generate a once-modified code, stores the once-modified code in the first memory and causes the transmitting module to emit an encoded signal which includes the starting code and the once-modified code. Whenever the switch means is actuated thereafter, the first microprocessor reads out the starting code and latest modified code from the first memory, performs the algorithm on the latest modified code to generate a newly modified code, stores the newly modified code in the first memory and causes the transmitting module to emit an encoded signal which includes the starting code and the newly modified code. In response to the first encoded signal, the second microprocessor reads out the initial code from the second memory, performs the algorithm on the initial code to generate a once-modified code, stores the once-modified code in the second memory and carries out two comparisons, namely, a comparison of the initial code with the starting code of the first encoded signal, and a comparison of the modified code of the encoded signal with the once-modified code obtained from the initial code. For every subsequent encoded signal, the second microprocessor reads out the initial code and latest modified code from the second memory, performs the algorithm on the latest modified code to generate an additionally modified code, stores the additionally modified code in the second memory and again carries out a comparison of the initial code with the starting code of the respective encoded signal as well as a comparison of the modified code of such signal with the additionally modified code. If the codes of each pair being compared are identical, the second microprocessor causes the decoding module to emit a control signal for the performance of a security-related function whereas no control signal is emitted if the codes of at least one pair fail to match. In the event that the starting code and initial code are identical and the modified codes are not, the second microprocessor erases the last modified code to have been stored in the second memory and replaces it with the modified code contained in the last incoming signal. Since the modified code in the last incoming signal is the last code to be stored in the first memory, the last codes in the two memories are now identical. Accordingly, the modified code in the next incoming signal should match the next modified code calculated by the second microprocessor.

The second memory may include an array of registers for the storage of respective modified codes. The second microprocessor may then be programmed to load successive modified codes into successive registers of the array. To this end, the second microprocessor may check the registers to ascertain whether the register employed to store the previous modified code is working. If so, the second microprocessor stores the new modified code while, if not, the second microprocessor checks a new register to determine whether this is working. The procedure is repeated until a working register is found at which time the new modified code is stored.

The first unit may be designed to control a plurality of security-related functions, i.e., a plurality of different security operating units and/or different operations of a security operating unit capable of performing more than one operation. The switch means may then include a plurality of switches each of which controls a respective security-related function and has a respective switch code.

In one embodiment of a security system which can perform more than one security-related function, the second unit is provided with a plurality of outputs. Each output is arranged to send control signals to a different security operating unit or to regulate a different operation of a security operating unit designed to perform various operations. The different outputs are associated with different switches each of which causes the second unit to generate a control signal at a respective output. In response to actuation of such a switch, the first unit emits an encoded combination signal which includes the respective switch code, the starting code and a modified code.

In another embodiment of a security system which can perform a plurality of security-related functions, the security system includes a plurality of second units. Here, each second unit is arranged to transmit control signals to a different security operating unit or to regulate a different operation of a security operating unit capable of performing more than one operation. Different ones of the second units correspond to different switches and each of these different switches causes the respective second unit to generate a control signal. When such a switch is actuated, the first unit again emits an encoded combination signal which includes the respective switch code, the starting code and a modified code.

An additional embodiment of a security system capable of performing more than one security-related function includes a plurality of second units of which at least one is provided with a plurality of outputs. Each of the second units and each of the outputs is arranged to send control signals to a different security operating unit or to regulate a different operation of a security operating unit designed to perform various operations. A different switch is associated with each second unit and each output and causes the corresponding second unit or output to emit a control signal. As before, the first unit generates an encoded combination signal in response to actuation of each switch, and such combination signal includes the respective switch code, the starting code and a modified code.

The first unit may be provided with means for actuating two or more switches simultaneously. When more than one switch is actuated at one time, the first unit emits an encoded combination signal which, in addition to the starting code and a modified code, includes the switch code for each switch actuated.

Another aspect of the invention resides in a method of operating a security system. The method involves performing an algorithm on a starting security code at a first location to generate a first modified security code different from the starting code. An encoded signal which includes the first modified code is transmitted to a second location. The algorithm is performed on an initial security code at the second location to generate a second modified security code different from the initial code. The first modified code and second modified code are compared and a control signal for the performance of a security-related function is generated when and only when these two codes are identical.

The step of performing the algorithm at the first location may be repeated to generate n-times modified security codes obtained by operating with the algorithm n times beginning from the starting code. Additional encoded signals, each of which includes a respective n-times modified code, are transmitted to the second location. The step of performing the algorithm at the second location is likewise repeated in response to arrival of each additional encoded signal so as to generate respective m-times modified security codes obtained by operating with the algorithm m times beginning from the initial code. Each n-times modified code arriving at the second location is compared with the corresponding m-times modified code and an additional control signal for the performance of a security-related function is generated when and only when an n-times modified code is identical to the corresponding m-times modified code.

According to one embodiment of the method, each encoded signal includes the starting code as well as an n-times modified code. Here, the starting code of each encoded signal arriving at the second location is compared with the initial code and a control signal is generated when and only when the starting code of an encoded signal is identical to the initial code and, in addition, the n-times modified code of the incoming signal is identical to the corresponding m-times modified code.

The m-times modified codes may be stored. If the starting code of an incoming signal is identical to the initial code but the n-times modified code of the signal is different from the respective m-times modified code, the last m-times modified code to be stored is replaced by the n-times modified code of the incoming signal. Assuming that the security system is being operated by an authorized user, this should assure that the n-times modified code of the next signal to arrive at the second location is identical to the m-times modified code generated in response to such signal.

The novel features which are considered as characteristic of the invention are set forth in particular in the appended claims. The improved security system, as well as the improved method of operating a security system, will, however, be best understood upon perusal of the following detailed description of certain specific embodiments when read in conjunction with the accompanying drawings.

BRIEF DESCRIPTION OF THE DRAWINGS

FIG. 1 is a block diagram of a security system in accordance with the invention;

FIG. 2 is a circuit diagram of one module of the security system of FIG. 1; and

FIG. 3 is a circuit diagram of another module of the security system of FIG. 1.

DESCRIPTION OF THE PREFERRED EMBODIMENTS

A security system according to the invention is shown in FIG. 1. The security system is here assumed to include a first set of components constituting part of an antitheft apparatus of a first motor vehicle, a second set of components constituting part of an antitheft apparatus of a second motor vehicle, a third set of components constituting part of an apparatus for opening and closing the gates of a house, and a fourth set of components constituting part of an apparatus for opening and closing the gates of a factory. The first and second sets can serve to arm and disarm the respective antitheft apparatus and can provide an antitheft function and a panic function. The first and second sets of components are installed in the respective motor vehicles while the third and fourth sets of components are connected to the mechanisms which open and close the respective gates.

The security system comprises a first unit I which constitutes a remote-control unit and is designed to control the four sets of components. The remote-control unit I includes switch means in the form of a keyboard SW, an encoding module Ia, a transmitting module Ib which can be a radio transmitter, and a source of power in the form of a battery MB.

Each set of components (only one set is shown for simplicity) includes a second or receiving unit II having a receiving module IIa and a decoding module IIb. The four receiving units II can be identical and the respective receiving modules IIa can be radio receivers. Each decoding module IIb serves to send control signals to a central functional module or security operating unit III of the respective antitheft apparatus or the respective apparatus for opening and closing the gates.

The transmitting module Ib of the remote-control unit I, the receiving module IIa of the receiving unit II and the central functional module III can all be conventional. Therefore, only the encoding module Ia and the decoding module IIb are described below in detail.

The encoding module Ia is illustrated in FIG. 2 which also shows that the keyboard SW of the remote-control unit I has eight switches SW1,SW2,SW3,SW4,SW5,SW6,SW7,SW8. The encoding module Ia includes a microprocessor in the form of an integrated circuit IC1, e.g., COP 822C single chip microCMOS microcontroller of National Semiconductor Corporation, and a memory E1 which can be constituted by an EEPROM, e.g., NM 9308/COP494 256-bit serial electric erasable programmable memory of National Semiconductor Corporation. The integrated circuit or microprocessor IC1 is provided with an internal memory in the form of a RAM.

In the following description, exemplary values or part numbers for the various electrical and electronic components are indicated in parentheses.

The integrated circuit IC1 has twenty pins or connectors numbered 1 thru 20. The pin 6 of the integrated circuit IC1 is connected to positive while the pin 15 is connected to ground. The integrated circuit IC1 has an oscillating system, and pins 4 and 5 constitute part of such system. These pins 4 and 5 are connected to a ceramic resonator RI1 (1 MHz) disposed in parallel with a resistor R1 (1 Mo) and to ground through capacitors C1 and C2 (100 pF). The pin 16, which constitutes a reset pin, is connected to ground via a capacitor C3 (100 pF) and to positive via an arrangement consisting of a diode D9 (1N4004) in parallel with a resistor R2 (100 Ko). The eight pins 7,8,9,10,11,12,13,14 are respectively connected to the eight switches SW1,SW2,SW3,SW4,SW5,SW6,SW7, SW8, which can be considered to represent control keys for the integrated circuit IC1, through respective diodes D1,D2,D3,D4,D5,D6,D7,D8 (1N4004) and a bus B1.

The memory E1 has six pins or connectors, 1,2,3,4,5,8. The pin 3 of the memory E1 serves for the storage of data in the memory E1 while the pin 4 serves for the retrieval of data therefrom. The pins and 4 of the memory E1 are respectively connected to the pins 1 and 3 of the integrated circuit IC1. The pin 1 of the memory E1 is a selector pin which makes it possible to select EEPROM and need not be used when only an EEPROM is to be employed. The pin 19 of the integrated circuit IC1 is connected to the pin 1 of the memory E1. The pin 2 of the memory E1, which serves for the delivery of clocking pulses, is connected to the pin 2 of the integrated circuit IC1. The pin 8 of the memory E1 is connected to positive whereas the pin 5 is connected to ground.

The pin 17 of the integrated circuit IC1 is connected to an output terminal TU1 for carrier signals and the pin 20 is connected to a second output terminal TU2 for modulation signals. The pin 18 is connected to the base of a transistor T1 (NPN BC182) which controls a second transistor T2 (PNP BC182). The transistor T1 is provided with load resistors (1 Mo) at its base. The collector of the transistor T1 is connected to ground while its emitter is connected to the base of the transistor T2 through a resistor R7 (27 Ko) and to positive through the resistor R7 and a second resistor R5 (100 Ko).

The base of the transistor T2 is connected to one terminal of each of the eight switches SW1,SW2,SW3,SW4,SW5,SW6,SW7,SW8 via the resistor R7 and respective diodes D10,D11,D12,D13,D14,D15,D16, D17. The opposite terminals of the switches SW1,SW2,SW3,SW4,SW5,SW6,SW7,SW8 are permanently connected to ground. The collector of the transistor T2 is permanently connected to a positive terminal and its emitter is connected to a positive supply line for the encoding module Ia containing the integrated circuit IC1 and memory E1.

The memory E1 is equipped with three 8-bit registers for storing a base security code or starting security code. The integrated circuit IC1 is programmed to perform an algorithm on the base code in response to a first actuation of the keyboard SW so as to generate a once-modified security code different from the base code; to perform the algorithm on the once-modified code in response to a second actuation of the keyboard SW so as to generate a twice-modified security code different from the once-modified security code; and so on. In general, the integrated circuit IC1 is programmed in such a manner that, in response to the nth actuation of the keyboard SW, the integrated circuit IC1 performs the algorithm on an $(n-1)$-times modified security code so as to generate an n-times modified security code. The new security codes obtained by operating with the algorithm may also be referred to as dynamic codes. The remote-control unit I may be provided with means AM for actuating two or more of the switches SW1,SW2,SW3,SW4,SW5,SW6,SW7,SW8 simultaneously and, in such an event, simultaneous actuation of two or more of the switches SW1,SW2,SW3,SW4,SW5,SW6,SW7,SW8 is considered as one actuation of the keyboard SW.

The memory E1 has an additional 8-bit register for storing the operations required by the algorithm in the order they are to be performed. By way of example, the algorithm may involve an addition, a subtraction, a multiplication and the performance of the complement in that order. The memory E1 has a further 8-bit register for storing, in the order they are to be employed, the numbers to be used in the respective operations. For the present example, these would be the number to be added to the base code, the number of be subtracted from the resulting sum and the number by which the result of the subtraction is to be multiplied. The memory E1 also has fifteen series of four 8-bit registers each for storing the modified codes.

Referring to FIG. 3, the decoding module IIb includes a microprocessor in the form of an integrated circuit IC2 and a memory E2 which can be constituted by an EEPROM. The integrated circuit IC2 may be identical to the integrated circuit IC1 and the memory E2 may be identical to the memory E1. Aside from the integrated circuit IC2, the memory E2 and a bus B2, elements in FIG. 3 similar to those in FIG. 2 are identified by the same reference characters followed by a prime. While the resistors R1',R2' and the capacitor C3' of FIG. 3 are identical to the resistors R1,R2 and the capacitor C3 of FIG. 2, the capacitors C1',C2' of FIG. 3 differ from the capacitors C1,C2 of FIG. 2 in that the capacitors C1',C2' each have a capacitance of 56 pF. The diode D9' of FIG. 3 differs from the diode D9 of FIG. 2 in that the part number of the diode D9' is 1N4148.

The pins or connectors 1,2,3,4,5,6,15,16,19 of the integrated circuit IC2 have the same functions as the corresponding pins of the integrated circuit IC1 and are connected in the same manner. The pin 17 of the integrated circuit IC2 is not used while the pin 18 is connected to ground via the bus B2. The pin 20 is connected through the bus B2 to an input terminal TE1 which receives signals arriving from the receiving module IIa.

The pins 14,13,12 of the integrated circuit IC2 constituting part of the receiving unit II installed in the first motor vehicle are respectively connected, via the bus B2, to output terminals U1,U2,U3 of the corresponding decoding module IIb. The output terminals U1,U2,U3 correspond to the switches SW1,SW2,SW3, respectively. The switches SW1,SW2,SW3 operate on different channels and each of the switches SW1,SW2,SW3 may thus be considered to have a unique switch code.

The central functional module III installed in the first motor vehicle can perform three different operations as follows: (i) arming and disarming of the antitheft apparatus; (ii) providing an antitheft function; and (iii) providing a panic function. The central functional module III has an input for each of these operations and the output terminal U1 of the respective decoding module IIb is connected to the input which controls arming and disarming of the antitheft apparatus, the output terminal U2 is connected to the input which controls the antitheft function and the output terminal U3 is connected to the input which controls the panic function.

The pins 11,10,9 of the integrated circuit IC2 constituting part of the receiving unit II installed in the second motor vehicle are respectively connected, via the bus B2, to output terminals U4,U5,U6 of the corresponding decoding module IIb. The output terminals U4,U5,U6 correspond to the switches SW4,SW5,SW6, respectively. Each of the switches SW4,SW5,SW6 operates on a different channel from all of the other switches SW1,SW2,SW3,SW7,SW8 and each of the switches SW4,SW5,SW6 may accordingly be considered to have a distinct switch code.

The central functional module III installed in the second motor vehicle can perform the same three operations as that in the first motor vehicle and again has an input for each operation. The output terminal U4 of the decoding module IIb in the second motor vehicle is connected to the input of the corresponding central functional module III which controls arming and disarming of the antitheft apparatus, the output terminal U5 is connected to the input which controls the antitheft function and the output terminal U6 is connected to the input which controls the panic function.

The pin 8 of the integrated circuit IC2 constituting part of the receiving unit II at the gate of the house is connected through the bus B2 to an output terminal U7 of the corresponding decoding module IIb. The output terminal U7 corresponds to the switch SW7 which operates on a different channel from the remaining switches SW1,SW2,SW3,SW4,SW5,SW6, SW8 and can therefore be considered to have a discrete switch code.

The central functional module III at the gate of the house functions solely to open and close the gate and thus need only have a single input. The output terminal U7 of the corresponding decoding module IIb is connected to this input.

The pin 7 of the integrated circuit IC2 constituting part of the receiving unit II at the gate of the factory is connected through the bus B2 to an output terminal U8 of the respective decoding module IIb. The output terminal U8 corresponds to the switch SW8 which operates on a different channel from the other switches SW1,SW2,SW3,SW4,SW5,SW6,SW7 and can thus be considered to have a unique switch code.

The central functional module III at the gate of the factory again functions solely to open and close the gate and hence need only have a single input. The output terminal U8 of the respective decoding module IIb is connected to such input.

Similarly to the memory E1 of the remote-control unit I, the memories E2 of each of the four receiving units II are equipped with three 8-bit registers for storage of the base code. The base code, which is constituted by 24 bits, i.e., three words of 8 bits each, is electrically stored in he three 8-bit registers of each memory E1,E2 during manufacture of the remote-control unit I and the receiving units II. Moreover, like the memory E1, each memory E2 has an additional 8-bit register for storing the operations required by the algorithm in the order they are to be performed and a further 8-bit register for storing, in the order they are to be employed, the numbers to be used in the respective operations. The operations required by the algorithm and the numbers to be employed are again stored in the respective registers of the four memories E1,E2 during manufacture of the remote-control unit I and the receiving units II. By way of example, the succession of operations may be represented by a 4-bit code as may the succession of numbers. Each memory E2 also resembles the memory E1 in having fifteen series of four 8-bit registers for storing modified codes obtained by successively operating with the algorithm beginning from the base code.

The security system operates as follows:

When one of the switches SW1,SW2,SW3,SW4, SW5,SW6,SW7,SW8 is actuated, i.e., closed, the base of the transistor T2 is grounded via the resistor R7. The transistor T2 is then excited and its emitter causes a positive potential to be applied to the encoding module Ia. Furthermore, the pin of the integrated circuit IC1 which is connected to the actuated switch is brought to a low potential.

The integrated circuit IC1 is programmed such that, when one of its pins is brought to a low potential due to closing of a switch SW1,SW2,SW3,SW4,SW5,SW6,SW7,SW8, the pin 18 emits a positive pulse. This excites the transistor T1 which, through the agency of its grounded collector, maintains the transistor T2 in conduction even when the switch is no longer actuated, i.e., even when the switch is reopened.

The positive potential applied to the encoding module Ia activates the integrated circuit IC1 which thereupon reads the base code and the algorithm stored in the memory E1 and stores the base code and the algorithm in its internal memory. Reading of the base code and the algorithm stored in the memory E1 is accomplished via the pin 3 of the integrated circuit IC1 which is connected to the pin 4 of the memory E1. The integrated circuit IC1 now performs the algorithm on the base code to calculate a once-modified code different from the base code. Thereafter, the integrated circuit IC1 generates an encoded signal which includes the base code, the once-modified code and the channel code, i.e., the code of the actuated switch and of the input pin for the corresponding signal. The once-modified code is stored in the memory E1 in the first of the registers provided for the storage of modified codes.

The operations performed by the integrated circuit IC1 are repeated whenever one of the switches SW1,SW2,SW3,SW4,SW5,SW6,SW7,SW8 is closed, that is, in response to each actuation of the keyboard SW. However, following the initial actuation of the keyboard SW, the algorithm is no longer performed on the base code. Instead, when the keyboard SW is actuated for a second time, the algorithm is performed on the once-modified code obtained by operating on the base code. This yields a twice-modified code which is stored in the memory E1 and is operated on by the algorithm in response to a third actuation of the keyboard SW to generate a thrice-modified code, and so on. In general, the integrated circuit IC1 performs the algorithm on consecutive modified codes with each modified code being obtained by operating with the algorithm on the previous modified code. Thus, when the keyboard SW is actuated for the nth time, the integrated circuit IC1 generates an n-times modified code derived by performing the algorithm n times beginning from the starting code.

Whenever the integrated circuit IC1 calculates a new modified code, the integrated circuit IC1 generates an encoded signal which includes the starting code, the new modified code and the channel code. Moreover, the integrated circuit IC1 then checks the registers provided in the memory E1 for the storage of modified codes in order to find the last occupied or working register. Once the last working register has been located, the new modified code is stored in the next register. In this manner, consecutive modified codes are stored in consecutive registers. The integrated circuit IC1 always performs the algorithm on the latest modified code to have been stored in the memory E1.

The encoded signals generated by the integrated circuit IC1 are transmitted to the receiving units II where they are received by the receiving modules IIa. Each receiving module IIa then forwards the encoded signals to the respective decoding module IIb.

The encoded signals arrive at the decoding module IIb by means of the pin 20 of the integrated circuit IC2. A potential is constantly applied to the pin 20 and, in response to arrival of the first encoded signal, the integrated circuit IC2 reads the base code and the algorithm stored in the memory E2 and stores the base code and the algorithm in its internal memory. Reading of the base code and the algorithm stored in the memory E2 is accomplished via the pin 3 of the integrated circuit IC2 which is connected to the pin 4 of the memory E2. The integrated circuit IC2 now performs the algorithm on the base code to calculate a once-modified code different from the base code. The integrated circuit IC2 then compares the base code in the memory E2 with the base code of the incoming encoded signal and further compares the once-modified code of such signal with the once-modified code calculated by the integrated circuit IC2. If the two base codes are identical and the two modified codes are identical, the integrated circuit IC2 emits a control signal at the output terminal U1,U2,U3,U4,U5,U6,U7,U8 corresponding to the channel code of the incoming encoded signal. Otherwise, no signal is generated by the integrated circuit IC2. When the two base codes agree and the two modified codes agree, the once-modified code calculated by the integrated circuit IC2 is stored in the memory E2 in the first of the registers provided for the storage of modified codes.

The preceding operations of the integrated circuit IC2 are repeated whenever an encoded signal arrives at the pin 20 thereof. However, after arrival of the first encoded signal, the algorithm is no longer performed on the base code. Instead, the algorithm is performed on a modified code which has been derived from the base code by operating with the algorithm m times beginning from the base code. Thus, in response to arrival of an encoded signal at the integrated circuit IC2, the latter generates an m-times modified code.

The integrated circuit IC2 calculates a new modified code in response to each incoming encoded signal and, when the base code of the signal is identical to the base code in the memory E2 and the modified code of the signal is identical to the new modified code, the new modified code is stored in the memory E2. To this end, the integrated circuit IC2 checks the registers provided in the memory E2 for the storage of modified codes in order to find the last occupied or working register. Once the last working register has been located, the new modified code is stored in the next register. In this manner, successive modified codes are stored in consecutive registers. The integrated circuit IC2 always performs the algorithm on the latest modified code to have been stored in the memory E2.

Depending upon the distance between the remote-control unit I and the four receiving units II, an encoded signal transmitted by the remote-control unit I in response to closing of one or more switches SW1,SW2,SW3,SW4,SW5,SW6,SW7,SW8 may be received by each of the receiving units II. Each decoding module IIb thereupon calculates a new modified code, compares the new modified code with the modified code in the signal and compares the base code in the signal with the base code in the respective memory E2. If the two base codes are identical and the two modified codes are identical for any or all of the decoding modules IIb, each such decoding module IIb generates a control signal at the output terminal or terminals U1,U2,U3,U4,U5,U6 U7,U8 corresponding to the actuated switch or switches. However, only the central functional modules III which are connected to these terminals are activated. For example, assume that the switch SW3, which provides a panic function for the first motor vehicle, is closed and that the resulting encoded signal is received by all four receiving units II. A control signal will appear at the output terminal U3 of each decoding module IIb. Nevertheless, only the panic function of the first motor vehicle will be activated. Thus, while the output terminal U3 of the decoding module IIb in the first motor vehicle is connected to a panic input of the central functional module constituting part of the antitheft apparatus of the first motor vehicle, the output terminals U3 of the remaining three decoding modules IIb are not connected to central functional modules.

In the event that the keyboard SW of the remote-control unit I is actuated at such a distance from a receiving unit II that the resulting encoded signal does not arrive at the receiving unit II, or in the event that the remote-control unit I is replaced by another remote-control unit I, e.g., a spare, having the same base code as the original remote-control unit I, the new modified code calculated by the integrated circuit IC2 of the receiving unit II in response to the next incoming encoded signal may not match the modified code of the signal. Under such circumstances, if the base code of the next incoming encoded signal matches the base code in the memory E2, the integrated circuit IC2 erases the last modified code stored in the memory E2 and replaces it with the modified code of the signal. However, no control signal is generated by the integrated circuit IC2 so that the operator of the remote-control unit I, who generated the incoming encoded signal by actuating the keyboard SW, does not receive a response to such actuation.

Since the last modified code to be stored in the memory E1 of the remote-control unit I is the modified code of the incoming signal, the last modified code in the memory E2 of the receiving unit II is now identical to the last modified code in the memory E1. Having received no response to the initial actuation of the keyboard SW, the operator will actuate the keyboard SW once more. The remote-control unit I then emits a new encoded signal containing a new modified code obtained by performing the algorithm on the last modified code stored in the memory E1. The new encoded signal causes the integrated circuit IC2 to operate with the algorithm on the last modified code stored in the memory E2. The resulting new modified code is identical to the new modified code in the new signal because the last modified code in the memory E2 was identical to the last modified code in the memory E1. Inasmuch as the base code of the new signal is the same as the base code in the memory E2 and the two new modified codes are likewise identical, the integrated circuit IC2 will now generate a control signal at the pin thereof corresponding to the actuated switch of the keyboard SW.

Even if an unauthorized person should intercept and store an encoded signal transmitted by the remote-control unit I, such person will be unable to activate the receiving units II and the central functional modules III associated therewith. The reason is that the decoding modules IIb will recognize the next arriving signal only if it contains a new modified code obtained from the modified code in the intercepted signal by operating on the latter modified code with the algorithm. In other words, any encoded signal can activate the receiving units II only once so that, if a signal is intercepted and stored while an authorized user is activating the receiving units II, the signal can no longer activate the receiving units II when it is subsequently retransmitted. Such an intercepted signal can be used to activate the receiving units II only by means of the algorithm which is unavailable to the unauthorized user. The algorithm can be made very complicated so that it becomes impossible to deduce the same even if more than one signal is intercepted.

The EEPROMs presented by way of example have registers which can be loaded and erased 10,000 times on average. Accordingly, the remote-control unit I can last for several decades.

Without further analysis, the foregoing will so fully reveal the gist of the present invention that others can, by applying current knowledge, readily adapt it for various applications without omitting features that, from the standpoint of prior art, fairly constitute essential characteristics of the generic and specific aspects of my contribution to the art and, therefore, such adaptations should and are intended to be comprehended within the meaning and range of equivalence of the appended claims.

I claim:

1. A security system, comprising a first unit for transmitting encoded signals, said first unit having switch means, and first calculating means for performing an algorithm in response to each actuation of said switch means so that, upon the nth actuation of said switch means, said first calculating means generates an n-times modified security code obtained by operating with said algorithm n times beginning from a starting security code, said first unit also having first emitting means for emitting an encoded signal, which includes said starting code and a respective n-times modified code, in response to each actuation of said switch means; and a second unit having second calculating means for performing said algorithm in response to each encoded signal arriving at said second unit so that, upon arrival of an encoded signal at said second unit, said second calculating means generates an m-times modified security code obtained by operating with said algorithm m times beginning from an initial security code, said second unit additionally having comparing means for comparing the starting code of each encoded signal arriving at said second unit with said initial code and for comparing the n-times modified code of each encoded signal arriving at said second unit with the corresponding m-times modified code, and said second unit further having second emitting means emitting a control signal for when and only when the starting code of an encoded signal arriving at said second unit is identical to said initial code and the n-times modified code of the signal is identical to the corresponding m-times modified code.

2. The system of claim 1, wherein said first unit constitutes a remote-control unit.

3. The system of claim 1, wherein said security codes are binary codes and said algorithm is binary coded.

4. The system of claim 1, wherein said first unit comprises a first memory containing said algorithm and said second unit comprises a second memory containing said algorithm.

5. The system of claim 4, wherein said starting code is stored in said first memory and said initial code is stored in said second memory, said starting code and said initial code being identical.

6. The system of claim 4, wherein said first unit comprises means for storing said n-times modified code in said first memory and said second unit comprises means for storing said m-times modified code in said second memory.

7. The system of claim 1, wherein said first unit comprises an encoding module, a transmitting module and a power source for said modules, said encoding module including a memory containing said algorithm, and a microprocessor having said first calculating means and means for storing modified codes in, and retrieving modified codes from, said memory, said first calculating means performing said algorithm upon the retrieved codes, and said transmitting module including said first emitting means and means for receiving said starting code and said n-times modified codes from said encoding module.

8. The system of claim 7, wherein said memory comprises an EPROM and said microprocessor comprises a RAM.

9. The system of claim 1, wherein said second unit comprises a decoding module and a receiving module for encoded signals having means for transferring arriving encoded signals to said decoding module, said decoding module including a memory containing said algorithm, and a microprocessor having said second calculating means and means for storing modified codes in, and retrieving modified codes from, said memory, said second calculating means performing said algorithm upon the retrieved codes.

10. The system of claim 9, wherein said memory comprises an EPROM and said microprocessor comprises a RAM.

11. The system of claim 1, wherein said second unit has a memory, and means for storing said m-times modified codes in said memory and replacing the last m- times modified code entered in said memory with the n-times modified code of an incoming encoded signal when the starting code of said incoming signal is identical to said initial code but the n-times modified code of said incoming signal is different from the m-times modified code generated by said second unit in response to said incoming signal.

12. The system of claim 1, wherein said second unit comprises a memory having an array of registers for the storage of respective m-times modified codes, said second unit having means for loading successive ones of said m-times modified codes into successive registers of said array.

13. The system of claim 1, wherein said second emitting means has a plurality of outputs and said switch means comprises a plurality of switches having respective switch codes, each of said switches causing said second emitting means to generate a control signal at a respective output, and said first emitting means emitting, in response to actuation of each switch, an encoded signal which further includes the respective switch code.

14. The system of claim 13, comprising a plurality of second units having respective second emitting means for control signals; and wherein said switch means comprises at least one additional switch having a respective switch code, each of said switches causing a respective second emitting means to generate a control signal, and said first emitting means emitting, in response to actuation of each switch, an encoded signal which includes the respective switch code.

15. The system of claim 14, wherein said first unit comprises means for actuating a plurality of said switches simultaneously.

16. The system of claim 1, comprising a plurality of second units having respective second emitting means for control signals; and wherein said switch means comprises a plurality of switches having respective switch codes, each of said switches causing a respective second emitting means to generate a control signal, and said first emitting means emitting, in response to actuation of each switch, an encoded signal which further includes the respective switch code.

17. The system of claim 16, wherein said first unit comprises means for actuating a plurality of said switches simultaneously.

18. A method of operating a security system, comprising the steps of repeatedly performing an algorithm at one or more first locations to generate a series of n-times modified security codes obtained by operating with said algorithm n times beginning from a starting security code; transmitting a plurality of encoded signals to a second location, each of said encoded signals including said starting code and an n-times modified code; performing said algorithm at said second location in response to arrival of each encoded signal to generate respective m-times modified security codes obtained by operating with said algorithm m times beginning from an initial security code; comparing the starting code of each encoded signal arriving at said second location with said initial code and comparing the n-times modified code of the signal with the corresponding m-times modified code; and generating a control signal for the performance of a security-related function when and only when the starting code of an encoded signal arriving at said second location is identical to said initial code and the n-times modified code of the signal is identical to the corresponding m-times modified code.

19. The method of claim 18, further comprising the steps of storing said m-times modified codes; and replacing the last m-times modified code stored with the n-times modified code of an incoming encoded signal when the starting code of said incoming signal is identical to said initial code but the n-times modified code of said incoming signal is different from the m-times modified code generated in response to said incoming signal.

* * * * *